C. D. MILLER.
AUTOMATIC SHUT-OFF SYSTEM FOR GAS AND LIQUIDS.
APPLICATION FILED SEPT. 1, 1909.

962,648.

Patented June 28, 1910.

WITNESSES:
Frederick C. Moeri
Louise Cox

INVENTOR
Cosby D. Miller
BY
George W. Hinton
ATTORNEY

UNITED STATES PATENT OFFICE.

COSBY D. MILLER, OF ST. JOSEPH, MISSOURI.

AUTOMATIC SHUT-OFF SYSTEM FOR GAS AND LIQUIDS.

962,648.

Specification of Letters Patent.　Patented June 28, 1910.

Application filed September 1, 1909.　Serial No. 515,589.

*To all whom it may concern:*

Be it known that I, COSBY D. MILLER, a citizen of the United States, residing at St. Joseph, in the county of Buchanan and State of Missouri, have invented certain new and useful Improvements in Automatic Shut-Off Systems for Gas and Liquids, of which the following is a specification, reference being had therein to the accompanying drawing.

My invention relates to improvements in shut-off systems, for gas and liquids, the objects of which are to provide a simple, substantial and durable system, provided with a shut-off valve, which, without any attention or care will, in case of fire, automatically close said valve and shut off gas from any ordinary service system of pipes through which said gas is being used.

A further object, is to provide opening means, whereby said valve may readily be opened, either at said valve or at some point on said shut-off system, distant from said valve, thereby causing a return of gas to said service system of pipes.

Still further objects are to embody a shut-off valve in said shut-off system, which will automatically shut off flow of gas, therethrough, when pressure of said gas is lowered to a certain predetermined low pressure from any cause, and will thereafter, continually act as a positive shut-off for said flow, until said valve is manually opened.

I attain these objects by the mechanism illustrated in the accompanying drawing, in which:—

Figure 1:
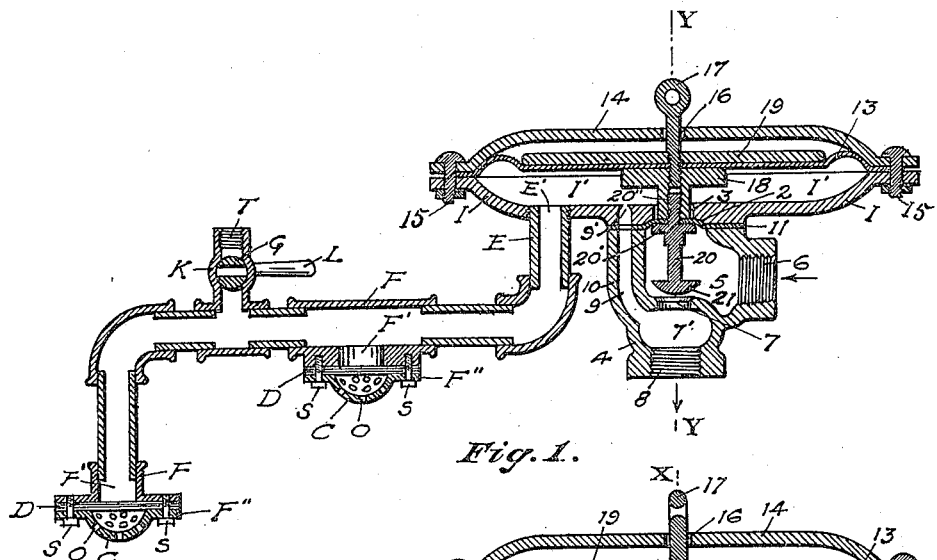
Figure 2:
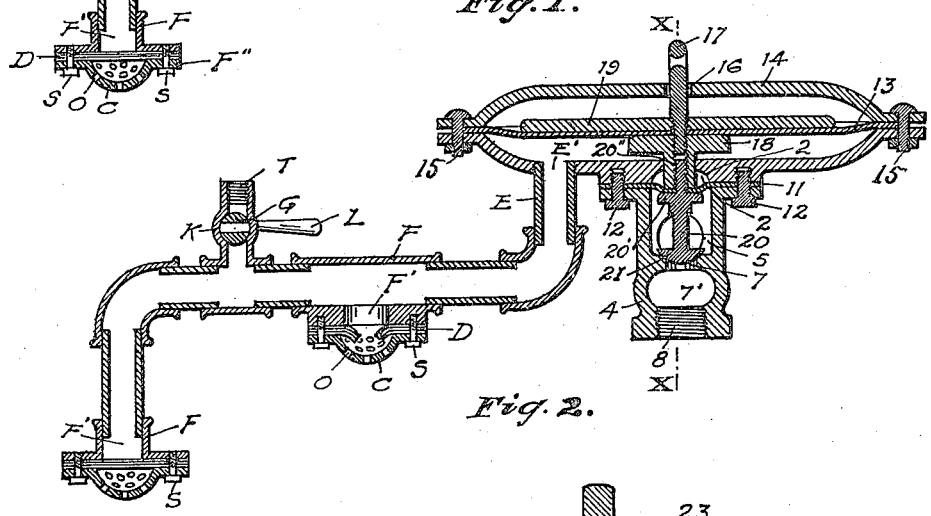
Figure 3:
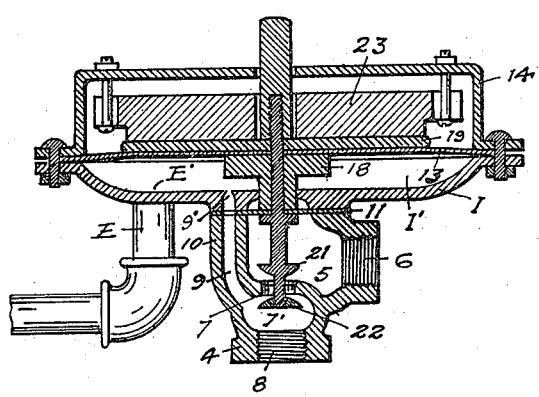

Figure 1 is a longitudinal section, on the line X X seen in Fig. 2 showing the valve open. Fig. 2 is a transverse section on the line Y Y seen in Fig. 1 showing the valve closed. Fig. 3 is a section similar to Fig. 1, showing one of the various forms of shut off valves, which may be embodied in the shut-off system.

Referring to Fig. 1, my invention comprises a plurality of exhaust pipes, one of which is seen at E, and since said pipes and the parts attached thereto are identically alike in their construction, operation and attachment to the shut-off valve hereinafter described, a detailed description of one of the pipes E is sufficient.

Pipe E extends throughout the apartments or premises, (not shown,) served by said shut-off system.

At desirable points along pipe E, fuse holders F are connected therewith, as seen. Said fuse holders each have an exhaust opening F', covered by a fusible diaphragm D, covered by cover C, to protect said diaphragm from mechanical injury. Said cover has openings O formed therethrough, to permit free circulation of air over the outside surface of diaphragm D, which is so made of fusible metal, that it will become fused or melted at a predetermined degree of heat.

Cover C has flange F'' formed on the outer edge thereof. Diaphragm D and cover C are secured to fuse holder F, by cap-screws S, which pass through said flange, and said diaphragm, and are screwed into fuse holder F.

Connected with pipe E, at any desired point thereon, is the exhaust cock K, provided with cock gate G, rotated by cock lever L, for manually opening and closing said cock, as hereinafter described. Said cock is provided with the screw threaded opening T, adapted to have either an air pump or a liquid pump connected therewith, for pumping either air or liquid into pipe E.

Pipe E is secured in opening E' formed through the bottom of diaphragm holder 1, of the following described diaphragm operated shut-off valve, and communicates with diaphragm chamber 1' formed in said holder. Said diaphragm holder is also provided with concaved recess 2, formed in the central portion of its lower surface, and has aperture and port opening 9' through the bottom thereof. Said port opening is made smaller in diameter than the diameter of opening E', which latter is therefore adapted to exhaust pressure of gas from said diaphragm chamber while said port opening is open.

Valve body 4, has valve chamber 5 formed therein, and the screw threaded inlet opening 6, leading into said valve chamber. Said valve body is also provided with valve opening 7, outlet chamber 7', and screw threaded outlet opening 8, leading from said valve chamber.

The ordinary service system of pipes through which gas is used, is secured in opening 8, and since said service system forms no part of my invention, the same is neither shown nor described.

In the wall 10, of valve body 4, is the port 9, which connects with the port opening 9', and forms communication between outlet chamber 7' and diaphragm chamber 1'. Said chamber is covered by a diaphragm 13, and resting on said diaphragm is the operating weight 19, covered by diaphragm cover 14, said cover having aperture 16, formed therethrough of ample size to admit bolt 17, and to permit free passage of air therethrough. Said diaphragm and cover are secured on said holder by bolts 15.

Stem guide 18 has its lower portion guided in aperture 3, and its upper portion contacting the under surface of diaphragm 13, which together with shut-off weight 19, are secured together by eyebolt 17, which is passed through said weight and diaphragm and is screwed into said stem guide.

Diaphragm holder 1 and valve body 4, have the outer edge portion of second diaphragm 11, placed between them, and are secured together by cap screws 12, seen in Fig. 2. Said second diaphragm provides closing means, for at all times closing aperture 3, in such manner as will allow stem guide 18 to be sensitive to every impulse, and move with perfect freedom in said aperture. Said second diaphragm also provides elastic packing for the contacting surfaces of said valve body and diaphragm holder, thereby rendering unnecessary the machining of said surfaces, and thus cheapening the cost of manufacturing said parts.

Valve stem 20 is provided with flange 20' formed thereon, and with the upper screw threaded portion 20", which is passed upward through the center of second diaphragm 11 and aperture 3 and is screwed into the lower portion of stem guide 18, thereby securing said stem, second diaphragm 11, and said stem guide together. Valve stem 20 has valve 21 secured on the lower end thereof, said valve being adapted to close valve opening 7.

In the installation of my invention, the described shut-off valve is preferably placed beyond the reach of fire, and the ordinary supply pipe, for supplying gas is connected with opening 6, the other pipe connections are made as shown and described, after which valve 21 is lifted, either manually by eyebolt 17, or by securing an ordinary air pump (not shown,) to the opening T of cock K and therewith, pumping air into the described system, until pressure of said air in diaphragm chamber 1' lifts shut-off weight 19 and parts attached thereto, to the position seen in Fig. 1.

In the operation of my invention, gas under pressure through opening 6 passes through valve chamber 5 and valve opening 7 into outlet chamber 8, thence into service system, not shown, and also from outlet chamber 8 said pressure of gas passes through port 9 and port opening 9', into diaphragm chamber 1', and thence through opening E' into exhaust pipe E, thence into exhaust openings F', in holders F, and against fusible diaphragm D. Said pressure of gas in the described parts is normally maintained while said system is in use. When heat from fire (not shown,) melts any one of the fusible diaphragms D, the described pressure of gas is exhausted through exhaust opening F', opened by the said melting of said fusible diaphragm, as seen in Fig. 2, and through pipe E, from diaphragm chamber 1', more rapidly than can be supplied to said chamber through the smaller diametered port 9 and port aperture 9', thereby lowering pressure of gas in said diaphragm chamber 1', upon which, shut-off weight 19 gravitates and moves the parts attached thereto, including valve 21, to the position seen in Fig. 2, thereby shutting off said pressure of gas from outlet chamber 8 and from such service system of pipes as may be connected therewith. When desired said pressure of gas is again admitted to said outlet chamber and the described parts connected therewith, by lifting valve 21, as previously described.

It will be understood that shut-off weight 19 is made of the required amount to overcome any certain predetermined low pressure of gas, beneath diaphragm 13, and gravitate as hereinafter described. Said low pressure, in the use of gas, would be such pressure, lower than a predetermined service pressure, as would render uncertain, the burning of gas, in any gas burner.

It will be seen and understood from the foregoing, that so long as any pressure of gas from said service pressure, down to said low pressure, is maintained in chamber 1', beneath diaphragm 13, shut-off weight 19 is thereby held up, thereby holding the parts including valve 21, in the position seen in Fig. 1, and when from any cause, said pressure of gas goes below said low pressure, shut-off weight 19 gravitates and moves the parts attached thereto, including valve 21, from the position seen in Fig. 1, to the position seen in Fig. 2, closing opening 7.

It will be further seen and understood, that upon the return of a high supply pressure, or in fact any pressure of gas, in valve chamber 5, through inlet opening 6, shut-off valve 21 prevents any of said pressure of gas from entering outlet chamber 7', port 9 and diaphragm chamber 1', and that shut-off weight 19, supplemented by pressure of gas in valve chamber 5, on valve 21, holds said valve closed in shut-off position, until weight 19 and its attached parts, including said valve, are again lifted as previously described.

The described automatic closing of shut-off valve 21, and the continued retention of same, in said shut-off position, prevents the casualties, incident to the return of pressure of gas to said service system, after said pressure has become dangerously lowered, or has ceased from any cause.

While I have shown and described the pipe E as being connected with diaphragm chamber 1', of the previously described shut-off valve, it is evident that said pipe could be connected with the diaphragm chamber of any other one of the various forms of diaphragm operated shut-off valves, now known, in which an outlet chamber is connected by a port or an opening, with a diaphragm chamber, from which said pipe E would be adapted to exhaust pressure of gas, while said port or opening is open. One of such various forms of shut-off valves is seen in Fig. 3 in which, in addition to the parts previously described, valve stem 20 has a pressure regulating valve 22, secured on the lower end thereof, and in which a pressure regulating weight 23 is liftably mounted above shut-off weight 19, thereby providing a shut-off valve and a pressure regulating valve combined.

Having fully described my invention, what I claim as new and desire to secure by Letters Patent, is:—

1. In an automatic shut-off system, for gas and liquids; an exhaust pipe, having a plurality of fusible diaphragm holders, connected therewith, said holders each having an exhaust opening therein, and a fusible diaphragm secured thereon and covering said exhaust opening; in combination with a diaphragm operated shut-off valve, said shut-off valve comprising a diaphragm holder having a central aperture, a port opening and an exhaust opening through the bottom thereof, and a diaphragm chamber therein; a diaphragm covering said diaphragm chamber; a cover for covering said diaphragm, said cover having an aperture through the center thereof, and provided with securing means, whereby the edge of said cover, the edge of said diaphragm and the edge of said diaphragm holder are secured together; a valve body secured to said diaphragm holder, said body being provided with a valve chamber formed therein, and an inlet opening leading into said valve chamber; said body being further provided with a valve opening, an outlet chamber and an outlet opening leading from said valve chamber, and also with a port in the wall thereof, in register with said port opening in said diaphragm holder for placing said outlet chamber in communication with said diaphragm chamber; a valve in said valve chamber adapted to close said valve opening; a second diaphragm, for at all times closing said aperture in the bottom of said holder, said second diaphragm being adapted to form elastic packing between said valve body and said diaphragm holder; a valve stem, having its lower end formed with said valve and its upper end provided with securing means, whereby said valve stem is secured to said second diaphragm and connected to the first mentioned diaphragm; a weight, of predetermined amount, on the first mentioned diaphragm; a bolt, extending through said aperture in said diaphragm cover, through said weight, and through said first mentioned diaphragm, the lower end portion of said bolt being secured in said valve stem securing means, for securing said weight, said first mentioned diaphragm and said valve stem together.

2. In a shut-off system, in combination; a diaphragm operated shut-off valve, having a valve body and a diaphragm holder and securing means whereby said body and holder are secured together; said valve body having an inlet opening, a valve chamber, a valve opening, an outlet chamber and an outlet opening, forming a closable continuous passage through said body; a valve in said valve chamber, adapted to close said valve opening; a diaphragm chamber in said holder; an operating diaphragm covering said diaphragm chamber, a cover for covering said diaphragm and securing means whereby the edges of said cover and diaphragm are secured on said holder; communicating means whereby said outlet chamber is communicatively connected with said diaphragm chamber, said diaphragm chamber being provided with an exhaust opening formed through said diaphragm holder, said exhaust opening being adapted to exhaust gas from said diaphragm chamber while said communicating means is open; together with an exhaust pipe connected with said exhaust opening, said exhaust pipe having a fusible diaphragm holder, connected therewith, said holder having an exhaust opening therethrough, and a fusible diaphragm thereon and covering said exhaust opening and securing means, whereby said fusible diaphragm is secured on said holder.

3. In a shut-off system, a diaphragm operated shut-off valve provided with a diaphragm holder, having a diaphragm chamber therein and a plurality of exhaust openings through the bottom thereof, adapted to exhaust gas or liquid from said diaphragm chamber, in combination with a plurality of exhaust pipes connected with said exhaust openings, each of said pipes being provided with a plurality of fusible diaphragm holders, connected therewith, each of said last mentioned holders having an exhaust opening therethrough, and fusible closing means whereby said last mentioned exhaust opening is closed.

4. In an automatic shut-off system, a fusible diaphragm holder, having an exhaust opening therethrough, a fusible diaphragm, covering said exhaust opening; a cover, covering said diaphragm, said cover having openings therethrough, adapted to allow circulation of air therethrough and in contact with the outer surface of said fusible diaphragm and securing means, whereby the edges of said diaphragm and said cover are secured to said holder; an exhaust pipe connected with said holder; a shut-off valve, provided with an operating diaphragm, adapted to operate said shut-off valve; a diaphragm holder, for holding said operating diaphragm, said last mentioned holder having a diaphragm chamber therein and connecting means, whereby said last mentioned diaphragm holder is connected with said exhaust pipe, for communicatively connecting said diaphragm chamber with the exhaust opening through said fusible diaphragm holder.

5. In an automatic shut-off system, a fusible diaphragm holder, having an exhaust opening formed therethrough, said holder being adapted to be connected with an exhaust pipe; a fusible diaphragm covering said opening, a cover, covering said diaphragm said cover having openings therethrough; and securing means, whereby the edges of said diaphragm and of said cover are secured to said fusible diaphragm holder.

In testimony whereof I affix my signature in the presence of two witnesses.

COSBY D. MILLER.

Witnesses:
LUKE E. HINTON,
JAMES M. ROGERS.